United States Patent
Baba et al.

(10) Patent No.: US 8,486,228 B2
(45) Date of Patent: *Jul. 16, 2013

(54) LIGNOCELLULOSIC BIOMASS SACCHARIFICATION PRE-TREATMENT DEVICE

(75) Inventors: Tsuyoshi Baba, Saitama (JP); Junji Yasuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 13/180,271

(22) Filed: Jul. 11, 2011

(65) Prior Publication Data

US 2012/0012266 A1     Jan. 19, 2012

(30) Foreign Application Priority Data

Jul. 14, 2010    (JP) ................................ 2010-159840

(51) Int. Cl.
   *D21C 7/00*     (2006.01)
   *D21C 7/10*     (2006.01)
   *F25B 30/00*    (2006.01)

(52) U.S. Cl.
   USPC .................. 162/250; 162/17; 162/29; 162/47; 162/70; 162/239; 62/79; 62/238.1

(58) Field of Classification Search
   USPC ............. 162/1, 17, 29, 47, 70, 232, 233, 239, 162/250; 62/79, 238.1, 324.1, 324.6, 333, 62/335, 526
   See application file for complete search history.

(56) References Cited

U.S. PATENT DOCUMENTS

| | | | |
|---|---|---|---|
| 2011/0192559 A1* | 8/2011 | Venkatesh et al. | 162/29 |
| 2011/0203757 A1* | 8/2011 | Baba et al. | 162/250 |
| 2011/0239685 A1* | 10/2011 | Baba | 62/324.1 |

FOREIGN PATENT DOCUMENTS

| | | |
|---|---|---|
| JP | 2008-535524 A | 9/2008 |
| JP | 2010-115162 A | 5/2010 |
| WO | WO 2006/110900 A2 | 10/2006 |

* cited by examiner

*Primary Examiner* — Mark Halpern
*Assistant Examiner* — Dennis Cordray
(74) *Attorney, Agent, or Firm* — Arent Fox LLP

(57) ABSTRACT

Provided is a lignocellulosic biomass saccharification pre-treatment device capable of producing a pretreated material for saccharification. The lignocellulosic biomass saccharification pre-treatment device comprises a separation unit 4 which separates ammonia gas by heating a pretreated material for saccharification obtained from a substrate mixture obtained by mixing lignocellulosic biomass and ammonia water; a first heat recovery unit 25 which recovers heat-of-dissolution generated when ammonia gas is dissolved in water, and the heat supply units 8, 9, 10 which generate heat by using heat-of-dissolution recovered by the frst heat recovery unit 25 and supply the heat to the separation unit 4.

6 Claims, 1 Drawing Sheet

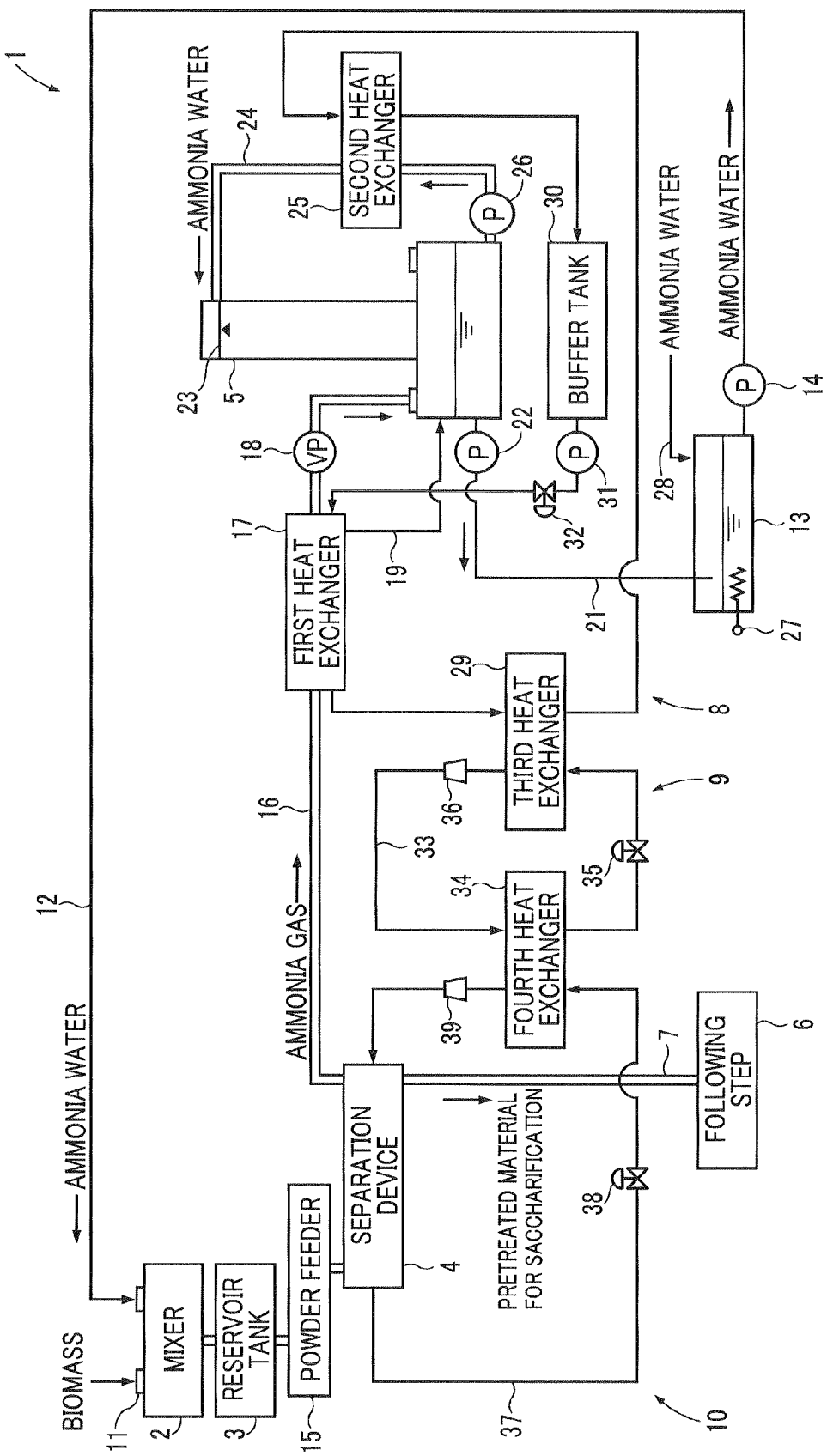

LIGNOCELLULOSIC BIOMASS SACCHARIFICATION PRE-TREATMENT DEVICE

BACKGROUND OF THE INVENTION

1. Field of the Invention

The present invention relates to a lignocellulosic biomass saccharification pre-treatment device.

2. Description of the Related Art

It has been conventionally known that ethanol is produced first by saccharifying a substrate mixture, which is obtained by mixing lignocellulosic biomass such as rice straw serving as a substrate with a solvent, with a saccharification enzyme microbially produced to obtain a saccharified solution, and then fermenting the saccharified solution. The lignocellulosic biomass herein is constituted of cellulose or hemicellulose having lignin tightly bound thereto.

Because of such constitution, the substrate mixture of lignocellulosic biomass and ammonia water is heated to dissociate lignin contained in lignocellulosic biomass or to swell lignocellulosic biomass. In this manner, cellulose or hemicellulose is rendered susceptible to saccharification to obtain a pretreated material for saccharification.

It is known that, in order to reduce the amount of pH moderator, which controls pH of the pretreated material for saccharification (to be subjected to saccharification) to be optimum pH, a pretreatment is performed prior to saccharification to obtain a pretreated material for saccharification from which ammonia has been separated (see, for example, National Publication of International Patent Application No. 2008-535524 and Japanese Patent Laid-Open No. 2010-115162).

However, in the saccharification pretreatment described in National Publication of International Patent Application No. 2008-535524, ammonia water is used in a low concentration of 0.18 to 15% by mass. Therefore, when ammonia is separated from a pretreated material for saccharification by heating the pretreated material, larger heat energy is required for separating, raising manufacturing cost.

Furthermore, in the saccharification pretreatment described in Japanese Patent Laid-Open No. 2010-115162, an extremely large amount of ammonia water is used relative to lignocellulosic biomass. In addition, after a whole pretreated material for saccharification is heated to a predetermined temperature, ammonia is separated from the pretreated material for saccharification. Accordingly, larger heat energy is required for separating ammonia from the pretreated material for saccharification, raising manufacturing cost. This is a disadvantage.

An object of the present invention is to provide a lignocellulosic biomass saccharification pre-treatment device capable of efficiently producing a pretreated material for saccharification from which ammonia has been separated when ammonia water is used for saccharification pretreatment of lignocellulosic biomass by overcoming the aforementioned disadvantage.

SUMMARY OF THE INVENTION

The lignocellulosic biomass saccharification pre-treatment device of the present invention is a lignocellulosic biomass saccharification pre-treatment device comprising a mixing unit configured to obtain a substrate mixture by mixing lignocellulosic biomass serving as a substrate and ammonia water; a reservoir unit configured to obtain a pretreated material for saccharification in which lignin is dissociated from the substrate or the substrate is swollen by storing the substrate mixture obtained by the mixing unit; and a separation unit configured to separate ammonia gas continuously from the pretreated material for saccharification by heating the pretreated material for saccharification supplied from the reservoir unit, in which the device comprises an ammonia recovery unit configured to recover the ammonia gas as ammonia water by dissolving the ammonia gas separated in the separation unit in water; a first heat recovery unit configured to recover heat-of-dissolution generated when ammonia gas is dissolved in water in the ammonia recovery unit; and a heat supply unit configured to generate heat to be supplied to the separation unit by using the heat-of-dissolution recovered by the first heat recovery unit as a heat source and to supply the heat to the separation unit.

In the lignocellulosic biomass saccharification pre-treatment device of the present invention, first, lignocellulosic biomass serving as a substrate and ammonia water are mixed in the mixing unit to obtain a substrate mixture.

Then, the substrate mixture is stored in the reservoir unit in which lignin is dissociated from the lignocellulosic biomass or lignocellulosic biomass is swollen. this manner, a pretreated material for saccharification is obtained.

In the present application, "dissociation" refers to cutting at least one part of binding sites at which lignin binds to cellulose or hemicellulose of lignocellulosic biomass. Furthermore, "swelling" refers to swelling caused due to voids, which are produced in cellulose or hemicellulose constituting crystalline cellulose by invasion of liquid, or caused due to voids produced within a cellulose fiber.

Next, a pretreated material for saccharification is supplied from the reservoir unit to the separation unit. Thereafter, the pretreated material, while being heated in the separation unit, continuously separates ammonia gas. As a result, a pretreated material for saccharification from which ammonia gas has been separated can be obtained.

Note that the ammonia gas separated in the separation unit is dissolved in water in the ammonia recovery unit and recovered as ammonia water; however, when ammonia gas is dissolved in water, heat-of-dissolution is generated. Because of this, the temperature of the ammonia water increases and the solubility of ammonia decreases, with the result that it becomes difficult to recover ammonia gas. This is a matter of concern.

Then, in the lignocellulosic biomass saccharification pre-treatment device of the present invention, the first heat recovery unit is provided to recover heat-of-dissolution. The heat-of-dissolution is used as a heat source for the heat supply unit and the heat generated by the heat supply unit is supplied to the separation unit in which a pretreated material for saccharification is heated for separating ammonia gas from the pretreated material for saccharification.

Therefore, according to the lignocellulosic biomass saccharification pre-treatment device of the present invention, heat generated by the heat supply unit using heat-of-dissolution as a heat source is supplied to the separation unit. In this manner, energy efficiency is enhanced and a pretreated material for saccharification from which ammonia has been separated can be efficiently produced.

Furthermore, according to the lignocellulosic biomass saccharification pre-treatment device of the present invention, ammonia gas separated from a pretreated material for saccharification by the separation unit is dissolved in water to obtain ammonia water. Thus, it is not necessary to store ammonia gas in a pressure container provided with incidental equipment such as a safety valve.

In the lignocellulosic biomass saccharification pre-treatment device of the present invention, the heat supply unit comprises a heat transfer unit, a first heat pump unit and a second heat pump unit. It is preferable that the heat transfer unit is configured to generate heat to be transferred to the first heat pump unit by heating a first heat medium circulating in the heat transfer unit by using heat-of-dissolution recovered by the first heat recovery unit as a heat source; the first heat pump unit is configured to generate the heat to be supplied to the second heat pump unit by heating a second heat medium circulating in the first heat pump unit by using the heat transferred by the heat transfer unit as a heat source; and the second heat pump unit is configured to generate the heat to be supplied to the separation unit by heating a third heat medium circulating in the second heat pump unit by using the heat generated by the first heat pump unit as a heat source.

In the heat supply unit, a low-temperature heat medium is required for cooling ammonia water in the first heat recovery unit, whereas a high-temperature heat medium is required for heating a pretreated material for saccharification in order to sufficiently separate ammonia gas from the pretreated material for saccharification in the separation unit.

In the heat supply unit using a single heat medium, a volume change ratio of the heat medium circulating in the heat supply unit increases and a circulation flow-rate thereof also increases. As a result, an device such as a compressor enlarges and equipment cost increases. Thus, it is difficult to reduce manufacturing cost.

Therefore, in the lignocellulosic biomass saccharification pre-treatment device of the present invention, the heat supply unit comprises the first heat pump unit using the second heat medium and the second heat pump unit using the third heat medium, and further comprises the heat transfer unit using the first heat medium in order to efficiently distribute energy to be used for compression of heat mediums in the first heat pump unit and the second heat pump unit.

Heat-of-dissolution recovered in the first heat recovery unit is used as a heat source for the heat transfer unit to heat the first heat medium. Heat generated by the heat transfer unit is transferred to the first heat pump unit.

Furthermore, the heat transferred to the heat transfer unit is used as a heat source for the first heat pump unit to heat the second heat medium. The heat generated by the first heat pump unit is supplied to the second heat pump unit.

Moreover, the heat generated by the first heat pump unit is used as a heat source for the second heat pump unit to heat the third heat medium. The heat generated by the second heat pump unit is supplied to the separation unit.

Therefore, according to the lignocellulosic biomass saccharification pre-treatment device of the present invention, heat-of-dissolution, which is generated when ammonia gas is dissolved in water in the first heat recovery unit, can be recovered by the heat transfer unit. Since ammonia water is cooled by recovery of heat-of-dissolution, ammonia gas can be easily recovered while preventing a temperature increase of the ammonia water.

Heat generated by the second heat pump unit is supplied to the separation unit and used for heating a pretreated material for saccharification. Therefore, ammonia gas can be sufficiently separated from the pretreated material for saccharification and the amount of ammonia water recovered in the ammonia recovery unit can be increased.

In the lignocellulosic biomass saccharification pre-treatment device of the present invention, it is preferable that the device comprises a second heat recovery unit configured to recover heat from ammonia gas separated in the separation unit; and the heat transfer unit generates heat to be transferred to the first heat pump unit by heating the first heat medium by using heat-of-dissolution recovered by the first heat recovery unit and heat recovered by the second heat recovery unit as heat sources.

The lignocellulosic biomass saccharification pre-treatment device of the present invention comprises the second heat recovery unit which recovers heat from ammonia gas separated in the separation unit. In this manner, surplus heat of ammonia gas can be recovered, further enhancing energy efficiency of the device. Furthermore, according to the second heat recovery unit, dissolution of ammonia gas in water can be facilitated by recovering surplus heat from the ammonia gas.

In the lignocellulosic biomass saccharification pre-treatment device of the present invention, it is preferable that the heat transfer unit comprises a flow-rate control unit configured to store the first heat medium circulating in the heat transfer unit and control the flow-rate ratio of the first heat medium circulating in the heat transfer unit and the second heat medium or the third heat medium.

The lignocellulosic biomass saccharification pre-treatment device of the present invention comprises the flow-rate control unit which controls the flow-rate ratio of the first heat medium circulating in the heat transfer unit and the second heat medium or the third heat medium to control the temperatures of the first, second and third heat mediums. Therefore, even if a load such as biomass and ammonia gas varies, variation of load given to the first and the second heat pump unit can be suppressed.

In the lignocellulosic biomass saccharification pre-treatment device of the present invention, the pretreated material for saccharification preferably flows countercurrently to the third heat medium in the separation unit.

Since the pretreated material for saccharification to be supplied to the separation unit diffuses ammonia by being heated in the separation unit, the concentration of ammonia water in the pretreated material for saccharification decreases after the pretreated material for saccharification is supplied to the separation unit until it is discharged from the separation unit. When concentration of ammonia water in the pretreated material for saccharification decreases, the boiling point of ammonia water increases.

Therefore, to sufficiently separate ammonia gas from the pretreated material for saccharification, the temperature of the pretreated material for saccharification flowing in the separation unit must be set to the boiling point of ammonia water corresponding to the concentration of ammonia water, after a pretreated material for saccharification is supplied to the separation unit until it is discharged from the separation unit.

Since a pretreated material for saccharification flows countercurrently to the third heat medium in the separation unit, the temperature difference between the pretreated material for saccharification and the third heat medium, which is required for sufficiently separating ammonia gas from the pretreated material for saccharification, can be ensured after the pretreated material for saccharification is supplied to the separation unit until it is discharged from the separation unit. As a result, heat exchange can be efficiently performed.

BRIEF DESCRIPTION OF THE DRAWINGS

FIG. 1 is a system configuration diagram of the lignocellulosic biomass saccharification pre-treatment device of the present invention.

DETAILED DESCRIPTION OF THE PREFERRED EMBODIMENTS

Referring to the accompany drawing, the embodiment of the present invention will be more specifically described in the following.

As shown in. FIG. 1, a lignocellulosic biomass saccharification pre-treatment device 1 of the embodiment comprises a mixer 2, which mixes lignocellulosic biomass (hereinafter, sometimes simply referred to as biomass) serving as a substrate and ammonia water to obtain a substrate mixture; a reservoir tank 3, which stores the substrate mixture obtained in the mixer 2 at a predetermined temperature for predetermined time to obtain a pretreated material for saccharification containing biomass from which lignin has been dissociated or swollen biomass; a separation device 4 which heats the pretreated material for saccharification to separate ammonia gas from the pretreated material for saccharification; an absorption tower 5 which allows water to absorb the ammonia gas separated by the separation device 4 and recovers the ammonia gas as ammonia water; and a transfer pipe 7 which lets out the pretreated material for saccharification from which ammonia gas has been separated by the separation device 4 and transfer it to the following step 6.

Furthermore, a heat transfer pipe line 8 through which a first heat medium flows, a first heat pump 9 using a second heat medium and a second heat pump 10 using a third heat medium are provided in order to recover heat-of-dissolution which generates when ammonia gas is dissolved in water in the absorption tower 5 and generate heat to be supplied to the separation device 4 by using the recovered heat-of-dissolution.

On the top of the mixer 2, an inlet 11 is provided for introducing biomass and an ammonia water supply pipe 12 is connected for supplying ammonia water. The end of the ammonia water supply pipe 12 on the upstream side is connected to the ammonia water tank 13. A pump 14 is provided in the middle thereof Furthermore, to the lower portion of the mixer 2, a reservoir tank 3 is connected for storing the substrate mixture supplied from the mixer 2.

To the lower portion of the reservoir tank 3, a powder feeder 15 is provided, which transfers a pretreated material for saccharification obtained by storing the substrate mixture for predetermined time, to the separation device 4.

The separation device 4 is configured to heat the pretreated material for saccharification with heat supplied from the second heat pump 10, thereby separating ammonia gas continuously from the pretreated material for saccharification. For example, the separation device 4 separates ammonia gas by feeding a heat medium to a multi-tubular heating pipe provided within the main-body shell, rotating the multi-tubular heating pipe to bring a heating pipe bundle into contact with a pretreated material for saccharification to heat the pretreated material for saccharification, thereby diffusing ammonia from the pretreated material for saccharification.

The separation device 4 has an ammonia gas pipe 16 connected onto the top for letting out ammonia gas separated from the biomass in the pretreated material for saccharification. The ammonia gas pipe 16 is connected to the absorption tower 5 via a first heat exchanger 17 (corresponding to the second heat recovery unit of the present invention).

Furthermore, the ammonia gas pipe 16 has a vacuum pump 18, which suctions ammonia gas and discharges it into the absorption tower 5, between the first heat exchanger 17 and the absorption tower 5. It is difficult for the pretreated material for saccharification to sufficiently diffuse ammonia only by moving in the separation device 4 after the material is supplied to the separation device 4 until it is discharged from the separation device 4 and by being heated thereby. Therefore, by suctioning ammonia gas by the vacuum pump 18, ammonia is sufficiently separated from the pretreated material for saccharification in the separation device 4.

If heat is recovered from ammonia gas by use of the first heat exchanger 17, the water content of the ammonia gas condenses. For recovering condensed water, a condensed water recovery pipe 19 is connected to the first heat exchanger 17. The condensed water recovery pipe 19 is connected to the absorption tower 5 and the recovered condensed water is used as water for generating ammonia water.

Furthermore, to the bottom of the separation device 4, a transfer pipe 7 is connected. The transfer pipe 7 is connected to the following step 6.

The absorption tower 5 is configured to store ammonia water at the bottom portion by allowing water to absorb ammonia gas separated by the separation device 4 to obtain ammonia water. To the bottom of the absorption tower 5, an ammonia water outlet pipe 21 which lets out the ammonia water is connected. The ammonia water outlet pipe 21 is connected to the ammonia water tank 13 via a pump 22.

The absorption tower 5 has a showering device 23 in the upper portion and an ammonia water circulation pipe 24, which withdraws ammonia water from the bottom of the absorption tower 5 and supplies it to the showering device 23 is connected to the showering device 23.

The ammonia water circulation pipe 24 has a second heat exchanger 25 (corresponding to the first heat recovery unit of the present invention) and has a pump 26, which is configured to suction ammonia water from the bottom of the absorption tower 5 and supply it to the showering device 23 of the absorption tower 5, between the absorption tower 5 and the second heat exchanger 25.

The ammonia water tank 13 comprises an ammonia concentration sensor 27 for detecting the concentration of ammonia water stored, and a concentrated ammonia water supply pipe 28 for supplying concentrated ammonia water to the ammonia water tank 13.

The heat transfer pipe line 8 is a pipe line through which the first heat medium, e.g., water, is circulated and has the first heat exchanger 17, the second heat exchanger 25, a third heat exchanger 29 and a buffer tank 30 in the middle of the pipe line 8.

The heat transfer pipe line 8 is used for feeding the first heat medium stored in the buffer tank 30 to the first heat exchanger 17, and then, to the third heat exchanger 29 and has a pump 31 for circulating the first heat medium within the heat transfer pipe line 8. Furthermore, the heat transfer pipe line 8 has a control valve 32 for controlling the circulation flow-rate of the first heat medium circulating within the heat transfer pipe line 8.

In the heat transfer pipe line 8 shown in FIG. 1, the buffer tank 30 for storing the first heat medium, the pump 31 and the control valve 32 are provided between the second heat exchanger 25 and the first heat exchanger 17. The buffer tank 30, the pump 31 and the control valve 32 can be provided not only between the second heat exchanger 25 and the first heat exchanger 17 but also between the first heat exchanger 17 and the third heat exchanger 29.

In the case where the buffer tank 30, the pump 31 and the control valve 32 are provided between the first heat exchanger 17 and the third heat exchanger 29, a temperature change of the first heat medium at the inlet on the secondary side of the third heat exchanger 29 can be suppressed by the heat capacity of the buffer tank 30 and stable operation of the first heat pump 9 and the second heat pump 10 can be made.

The heat transfer pipe line 8 is connected to the primary side of the first heat exchanger 17 for recovering heat from ammonia gas, to the primary side of the second heat exchanger 25 for recovering condensation heat, and to the secondary side of the third heat exchanger 29 for supplying heat to the first heat pump 9.

The first heat pump 9 comprises a first circulation pipe 33 through which the second heat medium e.g., R134a ($CF_3CH_2F$), is circulated and a fourth heat exchanger 34, an expansion valve 35, the third heat exchanger 29 and a compressor 36 in the middle of the first circulation pipe 33.

The first circulation pipe 33 is connected to the primary side of the third heat exchanger 29 for recovering heat from the first heat medium and connected to the secondary side of the fourth heat exchanger 34 for supplying heat to the second heat pump 10.

The second heat pump 10 comprises a second circulation pipe 37 through which the third heat medium, e.g., R245fa ($CF_3CH_2CHF_2$), is circulated and the separation device 4, an expansion valve 38, the fourth heat exchanger 34 and the compressor 39 in the middle of the second circulation pipe 37.

The second circulation pipe 37 is connected to the primary side of the fourth heat exchanger 34 for recovering heat from the first heat pump 9 and to the secondary side of the separation device 4 for separating ammonia gas by heating a pretreated material for saccharification.

Next, referring to FIG. 1, operation of the lignocellulosic biomass saccharification pre-treatment device 1 according to the embodiment will be described.

In the lignocellulosic biomass saccharification pre-treatment device 1 of the embodiment, first, lignocellulosic biomass is introduced in the mixer 2 through the inlet 11. Lignocellulosic biomass, e.g., a rice straw, is crushed by a cutter mill (not shown) into pieces having a size sufficient to pass through a mesh of 3 mm in size and then supplied to the inlet 11.

Next, ammonia water in the ammonia water tank 13 is supplied into the mixer 2 by the pump 14 through the ammonia water supply pipe 12. At this time, concentration of ammonia water to be supplied into the mixer 2 is controlled to be, for example, 25% by mass.

The biomass and the ammonia water are supplied to the mixer 2 such that the mass ratio of the biomass (dry mass) relative to the 25% by mass ammonia water becomes 1:1.

Next, the biomass and the ammonia water are mixed by the mixer 2 to form a substrate mixture in which the biomass and the ammonia water are mixed. The substrate mixture formed in the mixer 2 is stored in the reservoir tank 3 provided under the mixer 2 at a predetermined temperature, (e.g., 25° C.) for predetermined time (e.g., 100 hours). During the storage in the reservoir tank 3, the biomass is swollen with the ammonia water; at the same time, lignin of the biomass bound to cellulose and hemicellulose is dissociated from the biomass to form a pretreated material for saccharification.

The pretreated material for saccharification is then supplied to the separation device 4 via the powder feeder 15. At this time, the pretreated material for saccharification supplied to the separation device 4 is heated with the third heat medium heated by the second heat pump 10. Subsequently, ammonia is diffused from the pretreated material for saccharification in the separation device 4. In this manner, ammonia gas is separated from the pretreated material for saccharification.

The separation device 4 of the embodiment is configured such that the pretreated material for saccharification flows countercurrently to the third heat medium in the separation device 4.

The pretreated material for saccharification supplied to the separation device 4 moves within the separation device 4 after it is supplied to the separation device 4 until it is discharged from the separation device 4. Furthermore, the pretreated material for saccharification is heated in the separation device 4 to diffuse ammonia. As a result, the concentration of ammonia water in the pretreated material for saccharification gradually decreases. When the concentration of ammonia water in the pretreated material for saccharification decreases, the boiling point of the ammonia water increases.

Then, it is designed that a pretreated material for saccharification flows countercurrently to that of the third heat medium in the separation device 4 and a sufficient temperature difference between the pretreated material for saccharification and the third heat medium, which is required for sufficiently separating ammonia gas from the pretreated material for saccharification, is ensured after the pretreated material for saccharification is supplied to the separation device 4 from until it is discharged from the separation device 4. In this manner, heat exchange is efficiently performed.

Ammonia gas is suctioned by the vacuum pump 18 provided to the ammonia gas pipe 16, passes through the first heat exchanger 17 of the ammonia gas pipe 16 and is supplied to the absorption tower 5. The ammonia gas supplied to the absorption tower 5 is absorbed by the ammonia water showered from the showering device 23 and stored as ammonia water in the bottom portion of the absorption tower 5.

At this time, since surplus heat of the ammonia gas is recovered by the first heat exchanger 17, ammonia gas has been made to be easily absorbed by the ammonia water showered from the showering device 23. However, when ammonia gas is dissolved in water, heat-of-dissolution generates. Therefore, when the temperature of ammonia water is increased by heat-of-dissolution, ammonia may not be sufficiently dissolved in water. This is a matter of concern.

Then, in the embodiment, when ammonia water stored in the bottom portion of the absorption tower 5 is reflux to the absorption tower 5 through the ammonia water circulation pipe 24, the device is designed in such a manner that heat-of-dissolution is recovered by the second heat exchanger 25 provided to the ammonia water circulation pipe 24. As a result, in the absorption tower 5, a sufficient amount of ammonia gas is absorbed by the ammonia water showered from the showering device 23 and recovered as ammonia water.

Furthermore, in the ammonia water tank 13, the concentration of ammonia in the stored ammonia water is detected by the ammonia concentration sensor 27 and concentrated ammonia water is supplied depending upon the detected ammonia concentration, through the concentrated ammonia water supply pipe 28. As a result, the ammonia water in the ammonia water tank 13 is controlled in concentration to be, for example, 25% by mass, and supplied to the mixer 2 through the ammonia water supply pipe 12.

Meanwhile, the pretreated material for saccharification from which ammonia gas has been separated by the separation device 4 is transferred to the following step 6 through the transfer pipe 7. The following step 6 is a step of enzymatically saccharifying cellulose contained in the biomass by adding, for example, a predetermined amount of water and a saccharification enzyme to the pretreated material for saccharification from which ammonia gas has been separated.

At this time, the ammonia of the pretreated material for saccharification from which ammonia gas has been separated changes into ammonia gas by application of heat in the separation device 4 and further suctioned by the vacuum pump 18. Accordingly, the pretreated material for saccharification from which the ammonia gas has been sufficiently separated and containing residual ammonia, which is an extremely low amount of e.g., about 10 ppm, is transferred to the following step 6.

The heat recovered by the first heat exchanger 17 and the second heat exchanger 25 is transferred to the first heat pump 9 through the first heat medium circulating in the heat transfer pipe line 8.

In the case where, for example, water, is used as the first heat medium to be used in the heat transfer pipe line 8, water stored in the buffer tank 30 is supplied to the primary side of the first heat exchanger 17 by the pump 31. As a result, the water supplied to the first heat exchanger 17 recovers surplus heat of ammonia gas in the first heat exchanger 17 and increases in temperature.

Water recovering surplus heat of ammonia gas in the first heat exchanger 17 is fed to the secondary side of the third heat exchanger 29. As a result, the water fed to the third heat exchanger 29 supplies heat to the second heat medium of the first heat pump 9 and is cooled.

The water cooled by the third heat exchanger 29 is supplied to the primary side of the second heat exchanger 25. As a result, the water supplied to the primary side of the second heat exchanger 25 recovers heat-of-dissolution of ammonia gas in the second heat exchanger 25 and increases in temperature. In the second heat exchanger 25, water which recovers heat-of-dissolution of ammonia gas is supplied to the buffer tank 30.

In the first heat pump 9, when, e.g., R134a ($CF_3CH_2F$), is used as the second heat medium, R134a circulating through the first circulation pipe 33 is first expanded by the expansion valve 35 and then supplied to the primary side of the third heat exchanger 29. As a result, R134a absorbs heat transferred by the first heat medium of the heat transfer pipe line 8 in the third heat exchanger 29 and increases in temperature.

Next, R134a passed through the third heat exchanger 29 is supplied to the compressor 36 and compressed. The compressed R134a in the compressor 36 is supplied to the secondary side of the fourth heat exchanger 34 and used for heating the third heat medium on the primary side of the fourth heat exchanger 34. The R134a passed through the fourth heat exchanger 34 is supplied to the expansion valve 35.

In the second heat pump 10, when e.g., R245fa ($CF_3CH_2CHF_2$), is used as the third heat medium, R245fa circulating through the second circulation pipe 37 is first expanded by the expansion valve 38 and then supplied to the primary side of the fourth heat exchanger 34. As a result, R245fa absorbs heat generated by the first heat pump 9 in the fourth heat exchanger 34 and increases in temperature.

Next, R245fa passed through the fourth heat exchanger 34 is supplied to the compressor 39 and compressed. R245fa compressed in the compressor 39 is supplied to the secondary side of the separation device 4 and used for heating the pretreated material for saccharification on the primary side of the separation device 4 to diffuse ammonia from the pretreated material for saccharification to separate it. R245fa passed through the separation device 4 is supplied to the expansion valve 38.

Meanwhile, the pretreated material for saccharification supplied to the separation device 4 is heated to separate ammonia from the pretreated material for saccharification and thereafter transferred to the following step 6.

Note that, in the embodiment, the flow rate of water serving as the first heat medium and circulating through the heat transfer pipe line 8 is controlled by the control valve 32 provided to the heat transfer pipe line 8.

By controlling the flow rate of water serving as the first heat medium, flow-rate ratio of water and R134a serving as the second heat medium of the first heat pump 9 or R245fa serving as a heat medium of the second heat pump 10 is controlled. By controlling the flow-rate ratio of water serving as the first heat medium and R134a of the first heat pump 9 or R245fa of the second heat pump 10, the temperatures of water (the first heat medium), R134a (the second heat medium) of the first heat pump 9 and R245fa (the second heat medium) of the second heat pump 10 are controlled. In this manner, the amount of heat generated by the second heat pump 10 and supplied to the separation device 4 is controlled.

As a result, even if a load such as e.g., biomass and ammonia gas varies, variation of load given to the first heat pump 9 and the second heat pump 10 is suppressed.

What is claimed is:

1. A lignocellulosic biomass saccharification pre-treatment device comprising:
    a mixing unit configured to obtain a substrate mixture by mixing lignocellulosic biomass serving as a substrate and ammonia water;
    a reservoir unit configured to obtain a pretreated material for saccharification in powder form in which lignin is dissociated from the substrate or the substrate is swollen by storing the substrate mixture obtained by the mixing unit; and
    a separation unit configured to separate ammonia gas continuously from the pretreated material for saccharification in powder form by heating the pretreated material for saccharification supplied from the reservoir unit,
    wherein the device further comprises:
    an ammonia recovery unit configured to recover the ammonia gas as ammonia water by dissolving the ammonia gas separated in the separation unit in water;
    a first heat recovery unit configured to recover heat-of-dissolution generated when ammonia gas is dissolved in water in the ammonia recovery unit; and
    a heat supply unit configured to generate heat to be supplied to the separation unit by transferring the heat-of-dissolution recovered by the first heat recovery unit to the separation unit.

2. The lignocellulosic biomass saccharification pre-treatment device according to claim 1, wherein
    the heat supply unit comprises a heat transfer unit, a first heat pump unit and a second heat pump unit;
    the heat transfer unit is configured to generate heat to be transferred to the first heat pump unit by heating a first heat medium circulating in the heat transfer unit by transferring heat-of-dissolution recovered by the first heat recovery unit;
    the first heat pump unit is configured to generate the heat to be supplied to the second heat pump unit by heating a second heat medium circulating in the first heat pump unit by transferring the heat transferred by the heat transfer unit; and
    the second heat pump unit is configured to generate the heat to be supplied to the separation unit by heating a third heat medium circulating in the second heat pump unit by transferring the heat generated by the first heat pump unit.

3. The lignocellulosic biomass saccharification pre-treatment device according to claim 2, wherein
    the device comprises a second heat recovery unit configured to recover heat from ammonia gas separated in the separation unit; and
    the heat transfer unit generates heat to be transferred to the first heat pump unit by heating the first heat medium by transferring heat-of-dissolution recovered by the first heat recovery unit and heat recovered by the second heat recovery unit.

4. The lignocellulosic biomass saccharification pre-treatment device according to claim 2, wherein
the heat transfer unit comprises a flow-rate control unit configured to store the first heat medium circulating in the heat transfer unit and control the flow-rate ratio of the first heat medium circulating in the heat transfer unit relative to the second heat medium or relative to the third heat medium.

5. The lignocellulosic biomass saccharification pre-treatment device according to claim 2,
wherein the pretreated material and the third heat medium flow in the separation unit, and
wherein the pretreated material for saccharification flows countercurrently to the third heat medium in the separation unit.

6. The ignocellulosic biomass saccharification pre-treatment device according to claim 1, further comprising a powder feeder configured to transfer a pretreated material for saccharification in powder form supplied from the reservoir unit to the separation unit.

* * * * *